United States Patent
Jung

(10) Patent No.: US 11,619,768 B2
(45) Date of Patent: Apr. 4, 2023

(54) LIQUID LENS MODULE, CAMERA MODULE INCLUDING THE SAME, AND OPTICAL DEVICE INCLUDING THE MODULE

(71) Applicants: LG INNOTEK CO., LTD., Seoul (KR); CORNING INCORPORATED, Corning, NY (US)

(72) Inventor: Ji Young Jung, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 8 days.

(21) Appl. No.: 17/057,613

(22) PCT Filed: May 23, 2019

(86) PCT No.: PCT/KR2019/006207
§ 371 (c)(1),
(2) Date: Nov. 20, 2020

(87) PCT Pub. No.: WO2019/225988
PCT Pub. Date: Nov. 28, 2019

(65) Prior Publication Data
US 2021/0255371 A1    Aug. 19, 2021

(30) Foreign Application Priority Data
May 23, 2018   (KR) ........................ 10-2018-0058363

(51) Int. Cl.
*G02B 1/06*  (2006.01)
*G02B 3/12*  (2006.01)
(Continued)

(52) U.S. Cl.
CPC ............. *G02B 3/14* (2013.01); *G02B 26/004* (2013.01); *G02B 27/646* (2013.01); *G02B 3/12* (2013.01); *G02B 26/005* (2013.01)

(58) Field of Classification Search
CPC .......... G02B 3/12; G02B 3/14; G02B 26/004; G02B 26/005; G02B 27/646; G03B 3/10;
(Continued)

(56) References Cited

U.S. PATENT DOCUMENTS 8,027,096 B2 * 9/2011 Feng ........................ G02B 3/14
359/666
2006/0193058 A1 * 8/2006 Ootsuka ................... G03B 5/00
359/665

(Continued)

FOREIGN PATENT DOCUMENTS

CN    101059600 A    10/2007
EP    1 798 958 A1    6/2007
(Continued)

OTHER PUBLICATIONS

Chenguang et al., "The analysis on the optical power of focal length tunable liquid lens," Proceedings of SPIE, IEEE, US, vol. 9521, Mar. 4, 2015.

*Primary Examiner* — Mahidere S Sahle
(74) *Attorney, Agent, or Firm* — Birch, Stewart, Kolasch & Birch, LLP

(57) ABSTRACT

A liquid lens module includes a first plate comprising a cavity accommodating a conductive liquid and a non-conductive liquid; second and third plates disposed above and below the first plate, respectively; and first and second electrodes disposed on one side and another side of the first plate, respectively, wherein a ratio of a thickness of the first plate to a width of an incidence opening formed below the second plate in the cavity is greater than 0.3.

4 Claims, 5 Drawing Sheets

(51) Int. Cl.
*G02B 3/14* (2006.01)
*G02B 26/00* (2006.01)
*G02B 27/64* (2006.01)

(58) Field of Classification Search
CPC .......... G03B 17/12; G03B 3/00; G03B 30/00; G03B 2205/0084; H04N 5/2254
USPC .................................................. 359/665, 666
See application file for complete search history.

(56) References Cited

U.S. PATENT DOCUMENTS

| | | | |
|---|---|---|---|
| 2008/0088939 A1 | 4/2008 | Jung | |
| 2008/0231965 A1* | 9/2008 | Weekamp | G02B 7/028 |
| | | | 359/666 |
| 2010/0110532 A1* | 5/2010 | Takemoto | G11B 7/1374 |
| | | | 348/222.1 |
| 2010/0277923 A1* | 11/2010 | Takai | G02B 3/14 |
| | | | 359/666 |
| 2010/0284091 A1 | 11/2010 | Okamoto | |
| 2012/0026596 A1 | 2/2012 | Berge et al. | |
| 2012/0105971 A1 | 5/2012 | Lee et al. | |
| 2017/0315274 A1 | 11/2017 | Park et al. | |

FOREIGN PATENT DOCUMENTS

| | | | | |
|---|---|---|---|---|
| JP | 60-114802 A | 6/1985 | | |
| JP | 3-27090 B2 | 4/1991 | | |
| JP | 2009-519480 A | 5/2009 | | |
| JP | 2009-186595 A | 8/2009 | | |
| JP | 2013-61549 A | 4/2013 | | |
| JP | 2019-515342 A | 6/2019 | | |
| KR | 10-0797723 B1 | 1/2008 | | |
| KR | 10-2012-0045517 A | 5/2012 | | |
| KR | 10-2017-0123795 A | 11/2017 | | |
| KR | 10-1805128 B1 | 12/2017 | | |
| KR | 10-2018-0027048 A | 3/2018 | | |
| WO | WO-2005109074 A1 * | 11/2005 | ........... G02B 26/005 |
| WO | WO 2007/058451 A1 | 5/2007 | | |

\* cited by examiner

[FIG. 1]
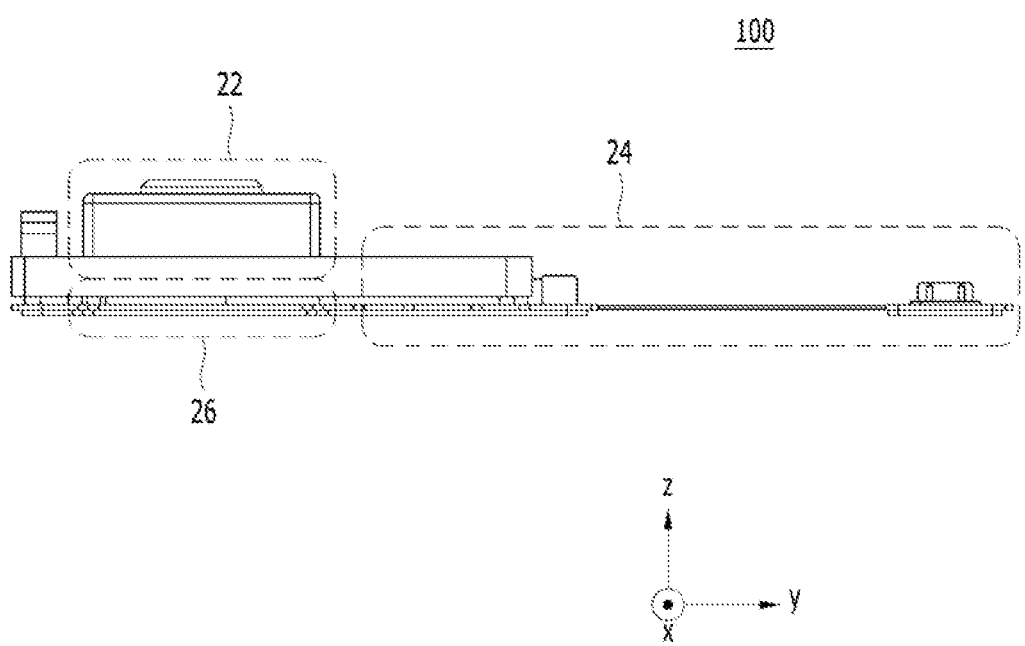

[FIG. 2]
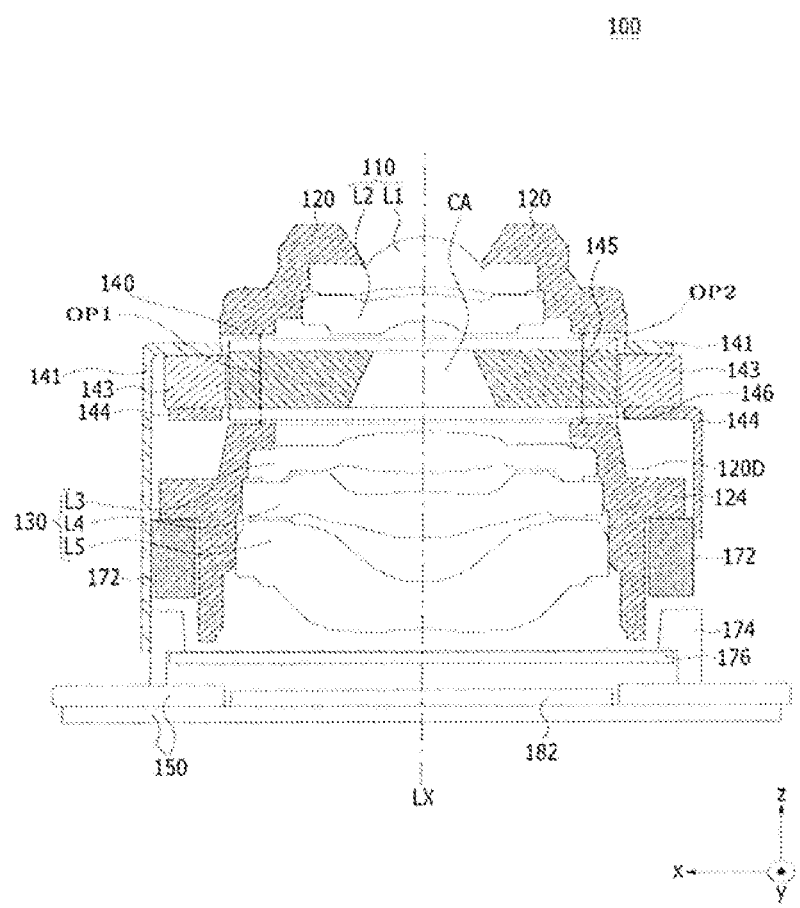

[FIG. 3]
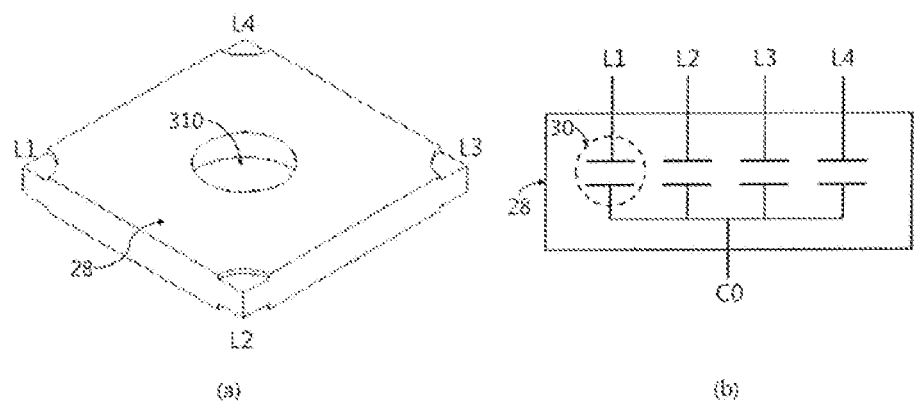
[FIG. 4]
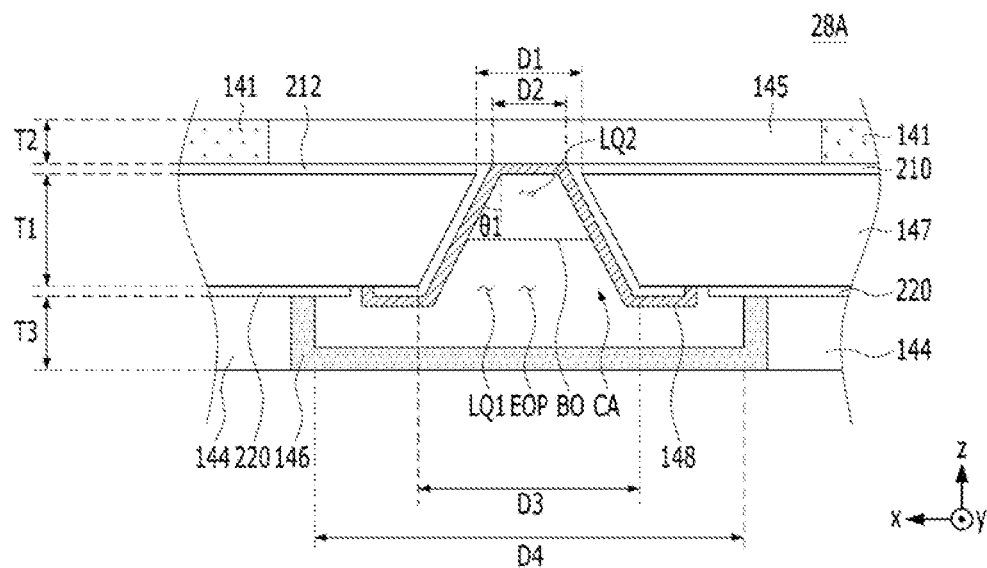

【FIG. 5a】
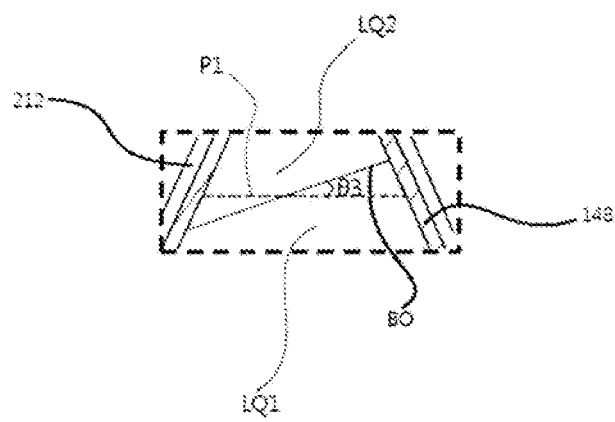
【FIG. 5b】
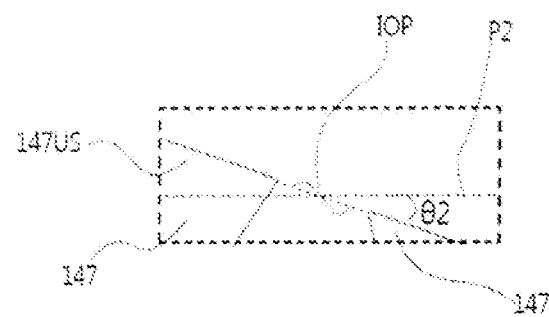

[FIG. 6]
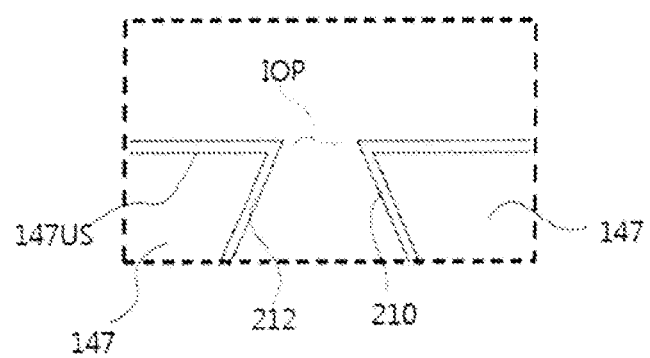

LIQUID LENS MODULE, CAMERA MODULE INCLUDING THE SAME, AND OPTICAL DEVICE INCLUDING THE MODULE

CROSS REFERENCE TO RELATED APPLICATIONS

This application is the National Phase of PCT International Application No. PCT/KR2019/006207, filed on May 23, 2019, which claims priority under 35 U.S.C. 119(a) to Patent Application No. 10-2018-0058363, filed in the Republic of Korea on May 23, 2018, all of which are hereby expressly incorporated by reference into the present application.

TECHNICAL FIELD

Embodiments relate to a liquid lens module, a camera module including the same, and an optical device including the camera module.

BACKGROUND ART

People who use portable devices demand optical devices that have high resolution, are small, and have various photographing functions (e.g. an optical zoom-in/zoom-out function, an auto-focusing (AF) function, a hand-tremor compensation or optical image stabilizer (OIS) function, etc.). These photographing functions may be realized by directly moving a plurality of lenses that are combined. In the case in which the number of lenses is increased, however, the size of an optical device may be increased. The auto-focusing function and the hand-tremor compensation function are performed by moving or tilting several lens modules, which are fixed to a lens holder so as to be aligned with an optical axis, along the optical axis or in a direction perpendicular to the optical axis, and a separate lens-moving apparatus is used to move the lens modules. However, the lens-moving apparatus consumes a lot of power, and a cover glass needs to be provided separately from a camera module in order to protect the lens-moving apparatus, thus leading to an increase in the overall thickness. Therefore, research has been conducted on a liquid lens configured to electrically adjust the curvature of an interface between two types of liquids in order to perform an auto-focusing function and a hand-tremor compensation function.

DISCLOSURE

Technical Problem

Embodiments provide a liquid lens module capable of more efficiently performing an OIS function, a camera module including the same, and an optical device including the camera module.

Technical Solution

A liquid lens module according to an embodiment may include a first plate including a cavity accommodating a conductive liquid and a non-conductive liquid, second and third plates disposed above and below the first plate, respectively, the second and third plates defining the cavity together with the first plate, and first and second electrodes disposed on one side and the other side of the first plate, respectively. The ratio of the thickness of the first plate to the width of an incidence opening formed below the second plate in the cavity may be greater than 0.3.

For example, the ratio may be greater than 0.3 and less than or equal to 0.42.

For example, the incidence opening may be located at the upper surface of the first plate that defines the upper portion of the cavity.

For example, the first electrode may be disposed on the upper portion and the inner inclined surface of the first plate, and the incidence opening may be located at the upper surface of the first electrode that defines the upper portion of the cavity.

For example, the incidence opening may be formed in a circular shape in plan, and the width of the incidence opening may correspond to the diameter of the circular shape.

For example, the width of the incidence opening may be 2.4 mm, and the thickness of the first plate may be 0.75 mm.

For example, the width of the incidence opening may be 1.4 mm, and the thickness of the first plate may be 0.45 mm.

For example, the module tilting angle of the liquid lens module may be 1° in a macro state.

A camera module according to another embodiment may include the liquid lens module.

An optical device according to still another embodiment may include the camera module.

The above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

In a liquid lens module, a camera module including the same, and an optical device including the camera module according to embodiments, the tilting angle of the camera module for enabling hand-tremor compensation of the camera module satisfies a requirement to be 1 degree, thereby enabling more efficient achievement of an OIS function.

The effects achievable through the embodiments are not limited to the above-mentioned effects, and other effects not mentioned herein will be clearly understood by those skilled in the art from the following description.

DESCRIPTION OF DRAWINGS

FIG. 1 illustrates a schematic cross-sectional view of a camera module according to an embodiment.

FIG. 2 illustrates a cross-sectional view of an embodiment of the camera module shown in FIG. 1.

FIG. 3 illustrates a liquid lens, the focal length of which is adjusted in response to a driving voltage.

FIG. 4 illustrates a cross-sectional view of a liquid lens module according to an embodiment.

FIG. 5A illustrates the state in which an interface between the two liquids shown in FIG. 4 is tilted, and FIG. 5B illustrates the state in which the first plate shown in FIG. 4 is tilted.

FIG. 6 is a cross-sectional view of a part of the liquid lens module for explaining the incidence opening and the emission opening shown in FIG. 4.

BEST MODE

Hereinafter, exemplary embodiments will be described in detail with reference to the accompanying drawings. While the disclosure is susceptible to various modifications and alternative forms, specific embodiments thereof are shown by way of example in the drawings. However, the disclosure should not be construed as being limited to the embodiments set forth herein, but on the contrary, the disclosure is to cover all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be directly on or under the other element, or can be indirectly formed such that one or more intervening elements are also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element, without necessarily requiring or involving any physical or logical relationship or sequence between such subjects or elements.

FIG. 1 illustrates a schematic cross-sectional view of a camera module according to an embodiment.

Hereinafter, a liquid lens module and a camera module including the liquid lens module according to embodiments will be described using the Cartesian coordinate system, but the embodiments are not limited thereto. That is, in the Cartesian coordinate system, the x-axis, the y-axis, and the z-axis are perpendicular to one another, but the embodiments are not limited thereto. That is, the x-axis, the y-axis, and the z-axis may cross one another, rather than being perpendicular to one another.

Hereinafter, a camera module 100 according to an embodiment will be described with reference to FIGS. 1 to 3. However, the liquid lens module according to the embodiment may also be applied to a camera module having a configuration different from that of the camera module 100 shown in FIGS. 1 to 3.

FIG. 1 illustrates a schematic side view of the camera module 100 according to an embodiment.

Referring to FIG. 1, the camera module 100 may include a lens assembly 22, a control circuit 24, and an image sensor 26.

First, the lens assembly 22 may include a lens unit and a holder in which the lens unit is accommodated. As will be described below, the lens unit may include a liquid lens module, and may further include a first lens unit or a second lens unit. Alternatively, the lens unit may include all of the first and second lens units and the liquid lens module.

The control circuit 24 serves to supply a driving voltage (or an operation voltage) to the liquid lens module.

The control circuit 24 and the image sensor 26 described above may be disposed on a single printed circuit board (PCB), but this is merely given by way of example, and the embodiment is not limited thereto.

When the camera module 100 according to the embodiment is applied to an optical device (or an optical instrument), the configuration of the control circuit 24 may be designed in different ways depending on the specifications required in the optical device. In particular, the control circuit 24 may be implemented as a single chip so as to reduce the magnitude of the driving voltage applied to the lens assembly 22. Thereby, the size of an optical device mounted in a portable device may be further reduced.

FIG. 2 illustrates a cross-sectional view of an embodiment of the camera module 100 shown in FIG. 1.

Referring to FIG. 2, the camera module 100 may include a lens assembly, a main board 150, and an image sensor 182. In addition, the camera module 100 may further include a middle base 172. In addition, the camera module 100 may further include a sensor base 174 and a filter 176. According to another embodiment, the sensor base 174 and the filter 176 may be omitted.

According to the embodiment, at least one of the components 110 to 176 of the camera module 100 shown in FIG. 2 may be omitted. Alternatively, at least one component different from the components 110 to 176 shown in FIG. 2 may be further included in the camera module 100.

Referring to FIG. 2, the lens assembly may include at least one of a liquid lens module 140, a holder 120, a first lens unit 110, or a second lens unit 130, and may correspond to the lens assembly 22 shown in FIG. 1. The lens assembly may be disposed on the main board 150.

In the lens assembly, the first lens unit 110 and the second lens unit 130 may be referred to as a 'first solid lens unit' and a 'second solid lens unit', respectively, in order to be distinguished from the liquid lens module 140.

The first lens unit 110 may be disposed at the upper side of the lens assembly, and may be a region on which light is incident from outside the lens assembly. That is, the first lens unit 110 may be disposed above the liquid lens module 140 within the holder 120. The first lens unit 110 may be implemented using a single lens, or may be implemented using two or more lenses that are aligned along a center axis to form an optical system.

Here, the center axis may be an optical axis LX of the optical system, which is formed by the first lens unit 110, the liquid lens module 140, and the second lens unit 130 included in the camera module 100, or may be an axis parallel to the optical axis LX. The optical axis LX may correspond to the optical axis of the image sensor 182. That is, the first lens unit 110, the liquid lens module 140, the second lens unit 130, and the image sensor 182 may be aligned along the optical axis LX through active alignment (AA).

Here, active alignment may mean an operation of aligning the optical axes of the first lens unit 110, the second lens unit 130, and the liquid lens module 140 with each other and adjusting an axial relationship or distance relationship between the image sensor 182 and the lens units 110, 130 and 140 in order to acquire an improved image.

In addition, as illustrated in FIG. 2, the first lens unit 110 may include, for example, two lenses L1 and L2, but this is merely given by way of example, and the first lens unit 110 may include one lens, or three or more lenses.

In addition, an exposure lens may be disposed at the upper side of the first lens unit 110. Here, the exposure lens may be the outermost lens among the lenses included in the first lens unit 110. That is, the lens L1 located at the uppermost side of the first lens unit 110 may protrude upwards, and therefore, may function as the exposure lens. The exposure lens faces the risk of damage to the surface thereof since it protrudes outwards from the holder 120. When the surface of the exposure lens is damaged, the quality of an image captured by the camera module 100 may be deteriorated. Therefore, in order to prevent or minimize damage to the surface of the exposure lens, a cover glass may be disposed, or a coating layer may be formed on the top of the exposure lens. Alternatively, in order to prevent damage to the surface of the exposure lens, the exposure lens may be formed of a wear-resistant material having higher rigidity than the lenses of the other lens units.

A first connection substrate 141 and a second connection substrate 144 are bent in the −z-axis direction. A spacer 143 may be disposed between the first connection substrate 141 and the second connection substrate 144, and may be disposed so as to protrude from at least one of a first or second opening OP1 or OP2 in the holder 120.

First and second holes may be formed respectively in the upper portion and the lower portion of the holder 120 to open the upper portion and the lower portion of the holder 120, respectively. The first lens unit 110 may be accommodated in, mounted in, seated in, in contact with, fixed to, provisionally fixed to, supported by, coupled to, or disposed in the first hole, which is formed in the holder 120, and the second lens unit 130 may be accommodated in, mounted in, seated in, in contact with, fixed to, provisionally fixed to, supported by, coupled to, or disposed in the second hole, which is formed in the holder 120.

In addition, the first and second sidewalls of the holder 120 may be disposed so as to face each other in a direction perpendicular to the direction of the optical axis LX (e.g. in the x-axis direction), and the third and fourth sidewalls may be disposed so as to face each other in a direction perpendicular to the direction of the optical axis LX (e.g. in the y-axis direction). In addition, the first sidewall of the holder 120 may include a first opening OP1, and the second sidewall thereof may include a second opening OP2 having a shape that is the same as or similar to that of the first opening OP1. Thus, the first opening OP1 disposed in the first sidewall and the second opening OP2 disposed in the second sidewall may be disposed so as to face each other in a direction perpendicular to the direction of the optical axis LX (e.g. in the x-axis direction).

The inner space in the holder 120, in which the liquid lens module 140 is disposed, may be open due to the first and second openings OP1 and OP2. In this case, the liquid lens module 140 may be inserted through the first or second opening OP1 or OP2 so as to be mounted in, seated in, in contact with, fixed to, provisionally fixed to, supported by, coupled to, or disposed in the inner space in the holder 120.

As such, in order to allow the liquid lens module 140 to be inserted into the inner space in the holder 120 through the first or second opening OP1 or OP2, the size of the first or second opening OP1 or OP2 in the holder 120 in the direction of the optical axis LX may be greater than the cross-sectional area of the liquid lens module 140 in the y-axis direction and the z-axis direction.

The second lens unit 130 may be disposed below the liquid lens module 140 within the holder 120. The second lens unit 130 may be spaced apart from the first lens unit 110 in the optical-axis direction (e.g. the z-axis direction).

The light introduced into the first lens unit 110 from outside the camera module 100 may pass through the liquid lens module 140 and may be introduced into the second lens unit 130. The second lens unit 130 may be implemented using a single lens, or may be implemented using two or more lenses, which are aligned along the center axis to form an optical system. For example, as illustrated in FIG. 2, the second lens unit 130 may include three lenses L3, L4 and L5, but this is merely given by way of example, and two or fewer lenses or four or more lenses may be included in the second lens unit 130.

Unlike the liquid lens module 140, each of the first lens unit 110 and the second lens unit 130 may be a solid lens formed of glass or plastic, but the embodiment is not limited as to a specific material of each of the first lens unit 110 and the second lens unit 130.

In addition, as shown in FIG. 2, the liquid lens module 140 may include a first connection substrate 141, a liquid lens 142, a spacer 143, and a second connection substrate 144.

The first connection substrate 141 may electrically connect a plurality of first electrodes (or individual electrodes) included in the liquid lens 142 to the main board 150, and may be disposed above the liquid lens 142. The first connection substrate 141 may be implemented as a flexible printed circuit board (FPCB).

In addition, the first connection substrate 141 may be electrically connected to an electrode pad (not shown), which is formed on the main board 150, via a connection pad (not shown), which is electrically connected to each of the first electrodes. To this end, after the liquid lens module 140 is inserted into the inner space of the holder 120, the first connection substrate 141 may be subjected to bending in the −z-axis direction toward the main board 150, and thereafter the connection pad (not shown) and the electrode pad (not shown) may be electrically connected to each other via conductive epoxy. In another embodiment, the first connection substrate 141 may be connected to a first holder surface electrode, which is conductive and is disposed, formed, or coated on the surface of the holder 120, so as to be electrically connected to the main board 150 via the first holder surface electrode, which is conductive and is disposed on the surface of the holder 120, but the embodiment is not limited thereto.

The second connection substrate 144 may electrically connect a second electrode (or 'common electrode') included in the liquid lens 142 to the main board 150, and may be disposed below the liquid lens 142. The second connection substrate 144 may be implemented as an FPCB or a single metal substrate (a conductive metal plate). Here, the first electrodes and the second electrode will be described later in detail with reference to FIGS. 3 and 4.

The second connection substrate 144 may be electrically connected to an electrode pad, which is formed on the main board 150, via a connection pad, which is electrically connected to the second electrode. To this end, after the liquid lens module 140 is inserted into the inner space of the holder 120, the second connection substrate 144 may be subjected to bending in the −z-axis direction toward the main board 150. In another embodiment, the second connection substrate 144 may be connected to a second holder surface electrode, which is conductive and is disposed, formed, or coated on the surface of the holder 120, so as to be electrically connected to the main board 150 via the second holder surface electrode, which is conductive and is disposed on the surface of the holder 120, but the embodiment is not limited thereto.

The spacer 143 may be disposed so as to surround the liquid lens 142, and may protect the liquid lens 142 from external impacts. To this end, the spacer 143 may have a shape that allows the liquid lens 142 to be mounted in, seated in, in contact with, fixed to, provisionally fixed to, supported by, coupled to, or disposed in the spacer.

In addition, the spacer 143 may be disposed between the first connection substrate 141 and the second connection substrate 144, and may be disposed so as to protrude from at least one of the first or second opening OP1 or OP2 in the holder 120. That is, at least a portion of the spacer 143 may be shaped so as to protrude, along with the first and second connection substrates 141 and 144, from at least one of the first or second sidewall of the holder 120 in the direction perpendicular to the optical axis LX (e.g. in the x-axis direction). The reason for this is that the length of the spacer 143 in the x-axis direction may be greater than the length of the holder 120 in the x-axis direction.

In addition, a cover (not shown) may be disposed so as to surround the holder 120, the liquid lens module 140, and the middle base 172, and may protect these components 120, 140 and 172 from external impacts. In particular, since the cover is disposed, a plurality of lenses, which form an optical system, may be protected from external impacts.

Meanwhile, the middle base 172 may be disposed so as to surround the second hole in the holder 120. To this end, the middle base 172 may include an accommodating hole (not shown) for accommodating the second hole therein. The inner diameter of the middle base 172 (i.e. the diameter of the accommodating hole) may be equal to or greater than the outer diameter of the second hole. The accommodating hole may be formed near the center of the middle base 172 at a position corresponding to the position of the image sensor 182, which is disposed in the camera module 100. The middle base 172 may be mounted on the main board 150 so as to be spaced apart from a circuit element on the main board 150. That is, the holder 120 may be disposed on the main board 150 so as to be spaced apart from the circuit element.

The main board 150 may be disposed below the middle base 172, and may include a recess in which the image sensor 182 may be mounted, seated, tightly disposed, fixed, provisionally fixed, supported, coupled, or accommodated, a circuit element (not shown), a connection part (or an FPCB) (not shown), and a connector (not shown).

The circuit element of the main board 150 may constitute a control module, which controls the liquid lens module 140 and the image sensor 182. The circuit element may include at least one of a passive element or an active element, and may have any of various areas and heights. The plurality of circuit elements may be disposed so as not to overlap the holder 120 in the direction parallel to the optical axis LX. The main board 150 may be implemented as a rigid flexible printed circuit board (RFPCB) including an FPCB. The FPCB may be subjected to bending depending on the requirements of the space in which the camera module 100 is mounted.

The image sensor 182 may perform a function of converting the light that has passed through the first lens unit 110, the liquid lens module 140, and the second lens unit 130 of the lens assembly 110, 120, 130 and 140 into image data. More specifically, the image sensor 182 may generate image data by converting light into analog signals via a pixel array including a plurality of pixels and synthesizing digital signals corresponding to the analog signals.

FIG. 3 illustrates a liquid lens, the focal length of which is adjusted in response to a driving voltage. Specifically, FIG. 3(a) illustrates a liquid lens 28 included in the lens assembly 22, and FIG. 3(b) illustrates an equivalent circuit of the liquid lens 28. Here, the liquid lens 28 may correspond to the liquid lens shown in FIG. 2.

First, referring to FIG. 3(a), the liquid lens 28, the focal length of which is adjusted in response to driving voltages, may receive driving voltages through sectors L1, L2, L3 and L4 of the first electrodes (hereinafter referred to as 'first electrode sectors'), which are disposed at the same angular interval from each other in four different directions. Here, the first electrode sectors are parts of the first electrodes, which are exposed without being covered by the second plate 145, as shown in FIG. 4, which will be described later. The first electrode sectors L1, L2, L3 and L4 may be disposed at the same angular interval from each other with respect to the center axis of the liquid lens 28, and the number of first electrode sectors may be four. The four first electrode sectors may be disposed at the four corners of the liquid lens 28, respectively. When driving voltages (hereinafter referred to as 'individual voltages') are applied through the first electrode sectors L1, L2, L3 and L4, the interface between the conductive liquid and the non-conductive liquid disposed in the lens region 310 may be deformed by the driving voltages, which are formed by the interaction between the applied individual voltages and the voltage applied to a second electrode sector CO (hereinafter referred to as 'common voltage'), which will be described later. Here, the second electrode sector is a part of the second electrode C, which is exposed without being covered by the third plate 146, as shown in FIG. 4, which will be described later.

In addition, referring to FIG. 3(b), the liquid lens 28 may be constituted by a plurality of capacitors 30, one side of each of which receives an individual voltage from a corresponding one of the respectively different first electrode sectors L1, L2, L3 and L4, and the other side of each of which is connected to the second electrode sector CO. Here, the capacitors 30 included in the equivalent circuit may have a low capacitance of about several tens to 200 picofarads (pF).

Hereinafter, the liquid lens module 140 according to the embodiment will be described with reference to FIG. 4. Here, the liquid lens module 140 may be included in the camera module 100 shown in FIG. 2, but the embodiment is not limited thereto.

FIG. 4 illustrates a cross-sectional view of a liquid lens module 28A according to an embodiment.

The liquid lens module 28A shown in FIG. 4 may include a first connection substrate 141, a liquid lens, a spacer 143, and a second connection substrate 144. An illustration of the spacer 143 is omitted from FIG. 4.

The liquid lens module 28A shown in FIG. 4 may correspond to the liquid lens module 140 shown in FIG. 2. Therefore, the first connection substrate 141, the liquid lens, and the second connection substrate 144 shown in FIG. 4 may respectively correspond to the first connection substrate 141, the liquid lens 142, and the second connection substrate 144 shown in FIG. 2, and thus a duplicate description thereof will be omitted.

The liquid lens may include a plurality of different types of liquids LQ1 and LQ2, first to third plates 147, 145 and 146, first electrodes 210 and 212, a second electrode 220, and an insulation layer 148.

The liquid lens may include a cavity CA. The cavity CA will be described later.

The liquids LQ1 and LQ2 may be charged, accommodated, or disposed in the cavity CA in the first plate 147. The liquids LQ1 and LQ2 may include a first liquid LQ1, which is conductive, and a second liquid (or an insulative liquid) LQ2, which is non-conductive. The first liquid LQ1 and the second liquid LQ2 may be immiscible with each other, and an interface BO may be formed at the contact portion between the first and second liquids LQ1 and LQ2. For example, the second liquid LQ2 may be disposed on the first liquid LQ1, but the embodiment is not limited thereto.

The first liquid LQ1 may be formed of, for example, a mixture of ethylene glycol and sodium bromide (NaBr). The second liquid LQ2 may be oil, and for example, may be phenyl-based silicon oil.

Each of the first liquid LQ1 and the second liquid LQ2 may include at least one of a sterilizer or an antioxidant. The antioxidant may be a phenyl-based antioxidant or a phosphorus (P)-based antioxidant. In addition, the sterilizer may be any one of alcohol-based, aldehyde-based, and phenol-based sterilizers. When each of the first liquid LQ1 and the second liquid LQ2 includes the antioxidant and the sterilizer, it is possible to prevent a change in the physical properties of the first and second liquids LQ1 and LQ2 attributable to oxidation of the first and second liquids LQ1 and LQ2 or propagation of microorganisms.

The first electrodes 210 and 212 and the second electrode 220 may be respectively disposed on one side and the other side of the first plate 147. The first electrodes 210 and 212 may be spaced apart from the second electrode 220, and may be disposed on one side (e.g. the upper surface, the side surface, and the lower surface) of the first plate 147. Here, the side surface of the first plate 147 may refer to the inner inclined surface of the first plate 147. That is, the first electrodes 210 and 212 may be disposed between the first plate 147 and the second plate 145.

The second electrode 220 may be disposed on at least a portion of the other side (e.g. the lower surface) of the first plate 147, and may be in direct contact with the first liquid LQ1. That is, the second electrode 220 may be disposed so as to extend to the conductive liquid LQ1 from the position between the first plate 147 and the third plate 146. Therefore, a portion of the second electrode 220, which is disposed on the other surface of the first plate 147, may be exposed to the first liquid LQ1, which is conductive.

Further, the first electrodes 210 and 212 may be singular or plural in number. If the first electrodes 210 and 212 are plural in number, the first electrodes 210 and 212 may be electrically isolated from each other. Each of the first electrode sensors and the second electrode sector described above may be at least one in number. For example, the first electrode sectors L1 to L4 may be sequentially disposed in the clockwise direction (or in the counterclockwise direction) about the optical axis.

Each of the first electrodes and the second electrode 210, 212 and 220 may be formed of a conductive material, e.g. metal, and specifically, may include chrome (Cr). Chromium or chrome is a glossy silver rigid transition metal, which is fragile, does not readily discolor, and has a high melting point. In addition, since an alloy including chromium exhibits high corrosion resistance and rigidity, chromium may be used in the form of being alloyed with other metals. In particular, since chrome (Cr) is not easily corroded or discolored, chrome exhibits high resistance to the first liquid LQ1, which is conductive and is charged in the cavity CA.

In addition, the second plate 145 may be disposed on one surface of each of the first electrodes 210 and 212. That is, the second plate 145 may be disposed above the first plate 147. Specifically, the second plate 145 may be disposed on the upper surfaces of the first electrodes 210 and 212 and the cavity CA.

The third plate 146 may be disposed on one surface of the second electrode 220. That is, the third plate 146 may be disposed below the first plate 147. Specifically, the third plate 146 may be disposed under the lower surface of the second electrode 220 and the cavity CA.

The second plate 145 and the third plate 146 may be disposed so as to face each other, with the first plate 147 interposed therebetween. In addition, at least one of the second plate 145 or the third plate 146 may be omitted.

Each of the second and third plates 145 and 146 may be an area through which light passes, and may be formed of a light-transmitting material. For example, each of the second and third plates 145 and 146 may be formed of glass, and for convenience of processing, may be formed of the same material. In addition, the edge of each of the second and third plates 145 and 146 may have a rectangular shape, without being necessarily limited thereto.

The second plate 145 may be configured to allow the light introduced from the first lens unit 110 to travel into the cavity CA in the first plate 145.

The third plate 146 may be configured to allow the light that has passed through the cavity CA in the first plate 145 to travel to the second lens unit 130. The third plate 146 may be in direct contact with the first liquid LQ1.

The insulation layer 148 may be disposed so as to cover a portion of the lower surface of the second plate 145 in the upper area of the cavity CA. That is, the insulation layer 148 may be disposed between the second liquid LQ2 and the second plate 145.

In addition, the insulation layer 148 may be disposed so as to cover portions of the first electrodes 210 and 212 that form the sidewall of the cavity CA. In addition, the insulation layer 148 may be disposed on the lower surface of the first plate 147 so as to cover the first electrodes 210 and 212 and the first plate 147. In this case, unlike what is illustrated in FIG. 4, the insulation layer 148 may be disposed so as to cover a portion of the second electrode 220 without interrupting contact between the second electrode 220 and the first liquid LQ1. Accordingly, contact between the first electrodes 210 and 212 and the first liquid LQ1 and contact between the first electrodes 210 and 212 and the second liquid LQ2 may be prevented by the insulation layer 148.

The insulation layer 148 may be formed of, for example, a coating agent such as parylene C, and may further include a white dye. The white dye may increase the rate of reflection of light from the insulation layer 148, which forms the sidewall of the cavity CA.

The insulation layer 148 may cover, among the first and second electrodes 210, 212 and 220, one electrode (e.g. the first electrodes 210 and 212), and may expose a portion of the other electrode (e.g. the second electrode 220) so that electrical energy is applied to the first liquid LQ1, which is conductive.

Meanwhile, the first plate 147 may include a cavity CA. The sidewall of the cavity CA may include an inclined surface corresponding to the inner surface of the first plate 147. Here, the inclined surface may be inclined at a predetermined first angle θ1 with respect to the optical axis. For example, the predetermined first angle θ1 may be 55° to 65°, or may be 50° to 70°. The interface BO formed by the two liquids LQ1 and LQ2 may be moved along the inclined surface of the cavity CA by a driving voltage.

In addition, the cavity CA may include an incidence opening IOP and an emission opening EOP. The incidence opening IOP is located at the upper side of the cavity CA, and the emission opening EOP is located at the lower side of the cavity CA, as shown in FIGS. 5B and 6, which will be described later. That is, the incidence opening IOP and the emission opening EOP are respectively located at the upper side and the lower side of the first plate 147.

Each of the incidence opening IOP and the emission opening EOP may be formed in a circular shape in a plan view, and may be formed in a through-hole shape when viewed in section. In this case, the width of the incidence opening IOP may correspond to the diameter of the circular shape.

Further, since the cavity CA is the area through which the light that has passed through the first lens unit 110 passes, the first plate 147 may be formed of a transparent material, or may include impurities so that light does not easily pass therethrough.

That is, the light that has passed through the first lens unit 110 may be incident on the second plate 145, and the light that has passed through the second plate 145 may be introduced into the incidence opening IOP, may pass through the cavity CA, and may be emitted to the second lens unit 130 through the emission opening EOP.

The cavity CA may be defined by the first to third plates 147, 145 and 146. That is, the cavity CA may be defined as an area that is surrounded by the inclined surface (or inner inclined surface) of the first plate 147, the incidence opening IOP, which is in contact with or adjacent to the second plate 145, and the emission opening EOP, which is in contact with or adjacent to the third plate 146.

The width (or diameter) of the wider opening among the incidence opening IOP and the emission opening EOP may be changed depending on the field of view (FOV) required for the liquid lens or the role of the liquid lens in the camera module 100.

As shown in FIG. 4, the area of the incidence opening IOP in the cavity CA, into which light is introduced, may be smaller than the area of the emission opening EOP disposed in the opposite direction.

Alternatively, the liquid lens may be disposed such that the direction of inclination of the cavity CA is opposite what is illustrated. That is, unlike what is illustrated in FIG. 4, the area of the incidence opening IOP in the cavity CA, into which light is introduced, may be larger than the area of the emission opening EOP, through which light is emitted. Further, when the liquid lens is disposed such that the direction of inclination of the cavity CA is opposite what is illustrated, the arrangement of all or some of the components included in the liquid lens may be changed, or only the direction of inclination of the cavity CA may be changed, and the arrangement of the remaining components may not be changed, depending on the direction of inclination of the liquid lens.

FIG. 5A illustrates the state in which the interface BO between the two liquids LQ1 and LQ2 shown in FIG. 4 is tilted, and FIG. 5B illustrates the state in which the first plate 147 shown in FIG. 4 is tilted.

FIG. 6 is a cross-sectional view of a part of the liquid lens module for explaining the incidence opening IOP and the emission opening EOP shown in FIG. 4.

According to an embodiment, as shown in FIG. 5B, the incidence opening IOP may be defined by an upper surface 147US of the first plate 147, which defines the upper portion of the cavity CA. That is, the incidence opening IOP may be located in the upper surface 147US of the first plate 147. In this case, the width (or diameter) of the incidence opening IOP (hereinafter referred to as an 'incidence diameter') may correspond to the width (or diameter) D1 of the upper surface 147US of the first plate 147, which defines the cavity CA.

According to another embodiment, as shown in FIG. 6, the incidence opening IOP may be located in the upper surfaces of the first electrodes 210 and 212, which define the upper portion of the cavity CA. In this case, the incidence diameter may correspond to a second width (or diameter) D2 defined by the first electrodes 210 and 212 disposed on the upper surface 147US of the first plate 147, which defines the cavity CA.

When the camera module 100 including the liquid lens module according to the embodiment is tilted to a predetermined second angle θ2, the first plate 147 may also be tilted to the same angle θ2, as shown in FIG. 5B. In FIG. 5B, reference numeral P2 denotes the position of the upper surface 147US of the first plate 147 when the liquid lens module (or the camera module including the liquid lens module) is not tilted.

As shown in FIG. 5B, when the camera module 100 (or the first plate 147) is tilted to the predetermined second angle θ2, the interface BO between the two liquids LQ1 and LQ2 may be tilted to a predetermined third angle 83. In FIG. 5A, reference numeral P1 denotes the interface BO between the two liquids LQ1 and LQ2 in the non-tilted state thereof.

The liquid lens module according to the embodiment has a characteristic in which the ratio R of the first thickness T1 of the first plate 147 to the incidence diameter is greater than 0.3, so the tilting angle of the camera module for enabling hand-tremor compensation of the camera module is 1 degree. Here, the incidence diameter may be the width (e.g. diameter) D1 or D2 of the incidence opening IOP. The ratio R may be expressed using Equation 1 below.

[Equation 1]

$$R = \frac{T1}{D}$$

Here, D may represent the incidence diameter.

According to the embodiment, in order to make the aforementioned ratio R greater than 0.3, the liquid lens module may be designed by varying the incidence diameter D while increasing the first thickness T1.

Hereinafter, a comparative example and the liquid lens module according to the embodiment will be compared and described.

The liquid lens module may perform an OIS function by applying different individual voltages to the individual electrode sectors E1 to E4 of the first electrodes 210 and 212 so as to tilt the interface BO between the two liquids LQ1 and LQ2. In order to efficiently perform the OIS function, the liquid lens module needs to satisfy the OIS tilting condition. Here, the OIS tilting condition is the condition in which the tilting angle of an optical device to which a camera module including a liquid lens module is applied (hereinafter, referred to as a 'module tilting angle') is 1°. Here, the module tilting angle corresponds to the predetermined second angle θ2, which is the above-described tilting angle of the first plate 147. The reason for this is that, when the optical device is tilted, the first plate 147 is also tilted to the same extent.

In order to satisfy the OIS tilting condition, the module tilting angle θ2 may preferably be 1°.

Table 1 below shows the ratio R of the liquid lens module according to the comparative example, in which the module tilting angle is not 1°, in a state of being focused at infinity.

TABLE 1

| T1 (mm) | D (mm) | R |
|---|---|---|
| 0.75 | 3.80 | 0.20 |
| 0.45 | 2.00 | 0.23 |

Referring to Table 1, it can be seen that the ratio R of the liquid lens module is 0.3 or less. As shown in Table 1, in the case of a liquid lens module having a ratio R of 0.3 or less, the module tilting angle θ2 is not 1° in a state of being focused at infinity. That is, the liquid lens module of Table 1 does not satisfy the OIS tilting condition.

In contrast, in the liquid lens module according to the embodiment, the first plate 147 has a first width D and a first thickness T1, which produce a ratio R greater than 0.3. Table 2 below shows the macro characteristics of the liquid lens modules according to the embodiments.

TABLE 2

| Classification | T1 (mm) | D (mm) | R | Module Tilting Angle (°) |
|---|---|---|---|---|
| Embodiment 1 | 0.75 | 2.4 | 0.313 | 1 |
| Embodiment 2 | 0.45 | 1.4 | 0.321 | 1 |

Table 2 shows the characteristics of the liquid lens modules according to the embodiments in which the first thickness T1 and the incidence diameter D are changed so that the ratio R exceeds 0.3.

Referring to Table 2, it can be seen that, in all of the liquid lens modules according to Embodiments 1 and 2, the ratio R exceeds 0.3, and the module tilting angle is 1° in a macro state (62.1 diopters).

Therefore, in the liquid lens module, the first plate 147 may be designed by adjusting the first thickness T1 and the incidence diameter so that the ratio R exceeds 0.3.

For example, assuming that the overall thickness of the liquid lens module shown in FIG. 4 is 1 mm or less, that the first thickness T1 of the first plate 147 is 0.75 mm, and that the range of the optical path within which light is incident on the liquid lens module is 1.6 mm to 1.85 mm, the ratio R that satisfies the OIS tilting condition in a state of being focused at infinity and in a macro state may be greater than 0.3 and less than or equal to 0.42, but the embodiment is not limited thereto. Here, the optical path is the aforementioned active area of light. When the liquid lens module is designed, so long as accurate amounts of first and second liquids LQ1 and LQ2 are charged therein and the angle θ1 of the inclined surface is accurate, i.e. so long as the liquid lens module is not mechanically defective, when the ratio R exceeds 0.3, the OIS tilting condition may be satisfied.

Meanwhile, an optical device may be implemented using the camera module 100 including the liquid lens according to the embodiment described above. Here, the optical device may include a device that may process or analyze optical signals. Examples of the optical device may include camera/video devices, telescopic devices, microscopic devices, an interferometer, a photometer, a polarimeter, a spectrometer, a reflectometer, an auto-collimator, and a lens-meter, and the embodiments may be applied to optical devices that may include a lens assembly.

In addition, the optical device may be implemented in a portable device such as, for example, a smartphone, a laptop computer, or a tablet computer. Such an optical device may include the camera module 100, a display unit (not shown) configured to output an image, a battery (not shown) configured to supply power to the camera module 100, and a body housing in which the camera module 100, the display unit, and the battery are mounted. The optical device may further include a communication module, which may communicate with other devices, and a memory unit, which may store data. The communication module and the memory unit may also be mounted in the body housing.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

MODE FOR INVENTION

Various embodiments have been described in the best mode for carrying out the disclosure.

INDUSTRIAL APPLICABILITY

A liquid lens module, a camera module including the same, and an optical device including the camera module according to embodiments may be used in camera/video devices, telescopic devices, microscopic devices, an interferometer, a photometer, a polarimeter, a spectrometer, a reflectometer, an auto-collimator, a lens-meter, a smartphone, a laptop computer, a tablet computer, etc.

The invention claimed is:

1. A liquid lens module, comprising:
   a first plate comprising a cavity accommodating a conductive liquid and a non-conductive liquid;
   second and third plates disposed above and below the first plate, respectively; and
   first and second electrodes disposed on one side and another side of the first plate, respectively,
   wherein the cavity has an inclined surface extending from an incidence opening formed below the second plate to an emission opening,
   wherein the incidence opening and the emission opening are circular, and a diameter of the incidence opening is smaller than a diameter of the emission opening,
   wherein a ratio of a thickness of the first plate between the incidence opening and the emission opening to the diameter of the incidence opening is greater than 0.3, and
   wherein a module tilting angle in a macro state is 1°.

2. The liquid lens module according to claim 1, wherein the ratio is 0.31 to 0.42.

3. The liquid lens module according to claim 1, further comprising an insulation layer on the inclined surface.

4. The liquid lens module according to claim 3, wherein the first electrode extends along the insulation layer.

* * * * *